3,636,034
SURFACTANT PRODUCTION VIA RHODIUM-
CATALYZED OXO PROCESS
Yoshio Ohsumi, Yoshiki Matsunaga, Mitsuo Yamaguchi, Hiroshi Ishida, Takeshi Onoda, and Masaru Onishi, Tokyo, Hiroshi Kasugai, Yokohama-shi, and Tadao Namiki, Kawasaki-shi, Japan, assignors to Mitsubishi Chemical Industries Limited, Tokyo, Japan
No Drawing. Filed Sept. 27, 1965, Ser. No. 490,697
Claims priority, application Japan, Oct. 2, 1964, 39/55,911
Int. Cl. C07c *141/04*
U.S. Cl. 260—459               1 Claim

ABSTRACT OF THE DISCLOSURE

A surface active composition comprising salts of high molecular weight alkyl sulfate. The salts are obtained by reacting one or more mono-olefins having 10 to 24 carbon atoms with carbon monoxide and hydrogen in the presence of a rhodium catalyst. The resultant product is hydrogenated to form high molecular weight alcohols and these are sulfated followed by neutralization of the resultant sulfation products by certain bases.

---

The invention relates to a process for the production of anionic surface active agents derived from high molecular weight alcohols. More particularly, the invention relates to a process for the production of sulfuric acid ester salts of high molecular weight alcohols, i.e., high molecular weight alkyl sulfates having 11 to 25 carbon atoms.

As detergents, there have been used in prior art alkylbenzenesulfonates derived from propylene tetramers or high molecular weight n-alkylsulfates derived from natural high molecular weight alcohols.

Because of the well-known nonbiodegradability of said alkylbenzenesulfonates, the clarification of sewage in which said alkylbenzenesulfonates remains unconsumed is found difficult to achieve, leading to contamination of rivers which is unfavorable from industrial or public hygienic viewpoints. For this reason, the employment of such hard detergents should be avoided. Moreover, said high molecular weight n-alkylsulfates cannot provide a surface active agent with satisfactory properties because of the inadequate detergency at low temperatures, although they are biodegradable.

Recently, there has been proposed, in place of natural high molecular weight alcohols (which are the raw materials of said high molecular weight alkylsulfates), high alcohols (Co-Oxo-alcohols) obtained by subjecting olefins, particularly n-olefin-1, to the Oxo-reaction by use of a cobalt catalyst, followed by hydrogenation.

The detergency of high molecular weight alkylsulfates obtained by sulfation of said Co-Oxo-alcohols is not satisfactory from a practical viewpoint, although it is better than that of the sulfates derived from natural alcohols.

Because of the peculiar nature of the Oxo-reaction, the alcohols derived therefrom are made up of various isomers. The distribution of these isomers varies substantially, depending on the reaction conditions. Naturally, the detergency and other properties of the sulfates derived from such an isomeric mixture depend upon the components of the latter. However, no systematic study has heretofore been available of the properties of such sulfates, except for certain properties of sulfates derived from individual Co-Oxo-alcohols, which have been classified according to the number of carbon atoms contained therein.

Relying on our extensive studies on chemical, physical and biological aspects of the correlation between the number of carbon atoms contained in raw material olefins subjected to Oxo-reaction or the conditions under which the Oxo-reaction takes place and the properties of sulfates derived from the Oxo-alcohols resulting from said Oxo-reaction, we have discovered that high molecular weight alkyl sulfates of excellent properties are produced by sulfating the Oxo-alcohol obtained. This is accomplished by subjecting olefins having a specific number of carbon atoms to the Oxo-reaction in the presence of a specific catalyst, and subsequently hydrogenating.

The object of the invention is to provide a process for producing high molecular weight alkyl sulfates excellent in detergency and biodegradability.

The object is accomplished by the reaction of at least one straight chain alpha olefin having from 10 to 24 carbon atoms, or a mixture consisting essentially thereof, with carbon monoxide and hydrogen in the presence of a rhodium catalyst. The products obtained by said reaction are then hydrogenated and the high molecular weight alcohols obtained by said hydrogenation are sulfated. This is followed by neutralization (with a base) of the resulting sulfates.

Olefins having approximately 10 to 24 carbon atoms which are applicable to the process of the invention include those having a double bond, such as $\alpha$-olefins obtained by subjecting ethylene to Ziegler's low polymerization or by wax-cracking; inner olefins obtained by subjecting n-paraffins to chlorination and subsequent dehydrochlorination; and mixtures thereof. In some cases, hydrocarbons containing said olefins may be useful also.

In accordance with the invention, the reaction of olefins with carbon monoxide and hydrogen is carried out in the presence of a rhodium catalyst in the form of, for example, inorganic salts of rhodium such as rhodium nitrate, rhodium sulfate, rhodium oxide, rhodium chloride, rhodium bromide, sodium chlororhodite, and ammonium chlororhodite; organo-metallic compounds of rhodium such as carbonyl - bis - (triphenylphosphine)-chloro-rhodium, and rhodium acetylacetonate; metallic rhodium; and carbonyl compounds of rhodium such as rhodium tricarbonyl and dichlororhodium tetracarbonyl. These materials are presumed to be converted to rhodium carbonyl or rhodium carbonyl complexes during the course of the reaction.

No specific limitations are imposed on the form in which the catalysts are employed. For example, they may be applied in the solid state as is, or may be dissolved in a suitable solvent before use, or may be placed on a suitable carrier such as active carbon. Although the amount of rhodium catalyst employed is not limitative, the amount usually corresponds to 0.1 to 500 mg. (preferably 2 to 50 mg.) of metallic rhodium per liter of Oxo-reaction liquid (olefin and reaction medium).

In the process according to the invention, the Oxo-reaction of olefins is carried out at a fixed temperature and pressure in the presence of the catalyst of a fixed proportion to the olefins and, if needed, a reaction medium while feeding thereto carbon monoxide and hydrogen. The reaction medium employed in the reaction may be (for example) an aromatic hydrocarbon such as benzene or toluene, or an aliphatic hydrocarbon. The proportions of carbon monoxide and hydrogen are usually in the range of from 1:3 to 3:1, preferably about 1:1. The reaction temperature employed is preferably about 30 to 300° C., most preferably from 60 to 160° C. The pressure is usually above 20 kg./cm.G., preferably about 100 to 300 kg./cm.² G.

The reaction mixture resulting from Oxo-reaction is hydrogenated, with or without prior catalyst removed, using hydrogen gas in the presence of a common hydrogenation catalyst such as nickel carried on an infusorial earth or copper-chromite under a pressure usually 1–500, preferably 50–200 kg./cm.² G. and a temperature usually 50–300, preferably 100–200° C., to yield the high molecular weight alcohol.

The Oxo-alcohol thus obtained as sulfated by use of a sulfating agent such as concentrated sulfuric acid, oleum, sulfur trioxide and chloro sulfonic acid in an amount such that the concentratde sulfuric acid: alcohol molar ratio is generally from 1.5:1 to 2.0:1, or the chlorosulfonic acid:alcohol molar ratio is about 1:1. Further, if the alcohol to be sulfated is solid under the reaction conditions, the use of an inert solvent such as chloroform or carbon tetrachloride is desirable in order to facilitate the reaction.

The sulfation product is neutralized by the adidtion of a suitable base, which may be a metal hydroxide such as sodium hydroxide, potassium hydroxide, calcium hydroxide, or magnesium hydroxide; organic amines such as diethanolamine and triethanolamine; and ammonia, while preferably avoiding the elevation of temperature. The theoretical value of said base is sufficient. For example, if sulfation is carried out by the use of the sulfuric acid: alcohol molar ratio of 1.5:1, approximately 2 moles of sodium hydroxide are required for neutralization A suitable diluent such as aqueous isopropanol may also be employed.

The neutralization product is effective with or without purification. Purification is effected by a process such that the neutralization products are dissolved in a suitable solvent such as methanol; insoluble inorganic salts are removed and the solvent is evaporated.

In the process according to the invention, either individual olefins or mixed olefins varying in the number of carbon atoms contained therein are useful as raw materials in this Oxo-reaction. Also, either a single alcohol or a mixed alcohol varying in number of carbon atoms is naturally useful in the sulfation. Mixed sulfates thus obtained from individual or mixed olefins are surface active agents having excellent properties unobtainable in a single, unmixed sulfate. The mixed sulfates should be combined with one another so as to give suitable proportions of individual sulfates, each having a specific number of carbon atoms.

In addition to the sulfates of other suitable surface active agents, a builder such so sodium sulfate phosphate or carboxymethyl-cellulose; an optical bleaching agent or extender may be used to improve the characteristics of the surface active agents.

Various properties of various alkyl sulfates (Rh-Oxo-sulfates) obtained by the process in accordance with this invention will now be compared with those of n-alkyl sulfates derived from commercial n-alcohols and those of alkyl sulfates (Co-Oxo-sulfates) derived through Oxo-reaction by cobalt catalyst. The Rh-Oxo-sulfates and Co-Oxo-sulfates having a single number of carbon atoms, are employed as samples in the following tests in the form of their sodium salts, which have been prepared by the method as described in Example 1 mentioned hereinafter. The n-alkyl sulfates are sodium salts obtained by sulfating a commercial alcohol similarly to the sulfating of the Oxo-alcohol in Example 1. The mixed sulfates were sodium salts as prepared by the method set forth in Examples 2 and 3.

Various properties of the surface active agent were determined as follows:

(1) Solubility in water

An aqueous solution containing 0.1% sample and an aqueous solution containing 0.3% sample were fed into a cylinder, respectively. The solutions were left standing for 15 minutes and then cooled gradually under stirring. The temperatures of the solutions were measured as indicated under Ts in the Table 1 when the sample dissolved in the solution started to separate. The resultant suspension was then gradually warmed with stirring in order to measure the temperature of the solution as indicated under Td in the Table 1 when the sample suspended in the solution was completely dissolved. These two temperatures as measured represent the solubility in water of the sample.

(2) Surface tension

The surface tension of an aqueous solution containing 0.33% sample at 20° C. and 40° C. was measured by the ASTMD 1331–56 method (Du Nouy's method).

(3) Emulsion stability 5 ml. of an aqueous solution containing 0.25% sample and 5 ml. of n-hexane were fed into a 30 ml. flat bottomed, graduated test tube having a ground stopper which was left standing for 1 hour at room temperatures. The test tube was then subjected to a treatment comprising a vigorous shaking in the longitudinal direction for 30 seconds, followed by standing for 1 minute. This is repeated five times to give an emulsion. Subsequently, measurement was made of the space of time required before either aqueous phase or organic phase separated from the emulsion reached 1 ml. volume. This space of time represents the emulsion stability.

(4) Foaming capacity 5 ml. of aqueous 0.25% sample solution was fed into a 30 ml. flat bottomed, graduated test tube having a ground stopper which was subjected to vigorous shaking in the longitudinal direction for 1 minute at room temperatures, and then allowed to stand for 10 minutes. Measurements were made of the volume of foam remaining in the test tube which is indicated under V in the Table 1. The volume of aqueous layer is indicated under Ve in the Table 1. These values represent the foaming capacity.

(5) Detergency (a) Preparation of soiled cloth.—A test cloth made of woolen muslin was washed by an aqueous 0.2% soap solution and dried to give an original cloth having 80% reflective index. Both of the outer and inner surfaces of the original cloth were dipped in a soiled liquid for 10 seconds each, and then dried in air to give a soiled cloth, said soiled liquid being prepared by diluting a mixture composed of 1 weight part of lanolin, 3 weight parts of liquid paraffin and some charcoal, all of which were kneaded together, with 1300 weight parts of carbon tetrachloride.

The amount of charcoal used in preparing the soiled liquid was suitably controlled so that the soiled cloth will acquire a reflective index of about 27% by the soiling.

The soiled cloth thus prepared was cut up to provide rectangular test pieces having dimensions of 5 cm. by 4 cm.

(b) Method of washing.—The washing machine employed was a Launder-o-meter adapted to be provided with twenty 565 ml. washing bottles. Before being placed in position, each of the washing bottles was filled with 1 g. of sample, 300 ml. of distilled water, and 10 rubber balls having a 10 cm. diameter. The Launder-o-meter provided with the twenty washing bottles was caused to rotate for 30 minutes at a fixed washing temperature; the bottles were then removed. In each of the bottles a test piece of the soiled cloth was placed; and again the bottles were mounted on the device which was caused to rotate for another 30 minutes at a fixed washing temperature. The test pieces thus washed were withdrawn from the bottles, rinsed with water, dried, and pressed.

Measurements were made of the reflective index of the aforesaid test pieces which had been washed and pressed. The detergency was calculated according to the following formula:

$$\text{Detergency} = \frac{C-B}{A-B} \times 100\%$$

in which A, B and C denote the reflective index of the original cloth before the soiling, the reflective index of the soiled cloth before the washing, and the reflective index of the test piece after the washing in percent, respectively.

The detergency for the case where washing is carried out in the presence of an inorganic salt is similarly determined by being subjected to washing test in the same way as mentioned above.

We have found that the Rh-Oxo-sulfates derived from olefins having 10 to 24 carbon atoms, particularly those from olefins having 12 to 20 carbon atoms, are exceedingly superior as shown in Table 2 to conventional n-alkyl sulfates and Co-Oxo-sulfates in respect of the detergency, particularly at a temperature in the neighbourhood of room temperatures. Moreover, to our extreme surprise we have found that the Rh-Oxo-sulfates are remarkably excellent over other sulfates in respect of detergency, too, in the case where a considerable amount of inorganic salts such as sodium sulfate or calcium chloride coexist,

TABLE 1

Properties excepting detergency of individual sodium salts of various alkyl sulfates

| Sulfate | | Solubility in water (° C.) with— | | | | Surface tension (dyne/cm.) at— | | Emulsion stability (sec.) | Foaming capacity (ml.) | |
|---|---|---|---|---|---|---|---|---|---|---|
| Sort | Carbon atom (number) | 0.1% | | 0.3% | | 20° C. | 40° C. | | V | Ve |
| | | Td | Ts | Td | Ts | | | | | |
| Rh-oxo-sulfate | 13 | (¹) | (¹) | (¹) | (¹) | 40.6 | 40.7 | 150 | 30 | 4.5 |
| | 15 | 30.3 | 10.3 | 31.5 | 9 | 37.8 | 37.9 | 320 | 25 | 4.7 |
| | 17 | 42.5 | 17 | 43.5 | 20.5 | 40.8 | 35.6 | 30 | 9 | 4.4 |
| | 19 | | 56 | 35 | | | | | 3.5 | 4.5 |
| | 21 | | 62 | 57 | | | | | 1.5 | 4.5 |
| Co-oxo-sulfate | 15 | 38.5 | 20 | 39 | 20 | 40.3 | 38.0 | 420 | 17 | 4.5 |
| n-Alkyl sulfate | 12 | (¹) | (¹) | (¹) | (¹) | 41.4 | 41.8 | 240 | 30 | 4.7 |
| | 14 | 40.5 | 12.5 | 41 | 13 | 36.6 | 34.7 | 660 | 23 | 4.3 |
| | 16 | 44 | 22.5 | 44.5 | 24 | 44.2 | 35.0 | 80 | 2 | 4.8 |
| | 18 | 53.5 | 24.5 | 56.0 | 27 | 47.8 | 38.6 | (²) | 2 | 4.8 |

¹ 5 or less.  ² 20 or less.

TABLE 2

Detergency of individual sodium salts of various alkyl sulfates

| Sulfate | | Detergency, percent | | | | |
|---|---|---|---|---|---|---|
| Sort | Carbon atom (No.) | Washing temperature of— | | | Added inorganic Salt | |
| | | 40° C. | 17° C. | 10° C. | Na₂SO₄¹ 17° C. | CaCl₂ 40° C. |
| Rh-oxo-sulfate | 11 | 2.3 | 1.4 | | | |
| | 13 | 15.1 | 9.1 | 7.4 | 12.0 | 13.0 |
| | 15 | 26.7 | 24.3 | 15.6 | 25.0 | 28.2 |
| | 17 | 40.8 | 26.8 | 20.0 | 20.0 | 10.4 |
| | 19 | 40.0 | 17.1 | | | |
| | 21 | 11.2 | 2.0 | | | |
| Co-oxo-sulfate | 13 | 18.9 | 8.6 | 6.4 | | |
| | 15 | 27.4 | 17.9 | 10.2 | 19.3 | 15.2 |
| | 17 | 43.1 | 15.7 | 12.0 | 13.2 | 0 |
| | 19 | 41.9 | 12.4 | | | |
| n-Alkylsulfate | 12 | 20.2 | 13.0 | 10.3 | 12.5 | 0 |
| | 14 | 28.0 | 10.0 | 5.0 | 2.0 | 3.1 |
| | 16 | 37.0 | 9.0 | 0 | 1.5 | 0 |
| | 18 | 42.0 | 0 | 0 | 0.5 | 0 |

¹ The amount of Na₂SO₄ added to sulfates was 50% by weight of the latter.
² The amount of CaCl₂ added to sulfates was 20% by weight of the latter.

as often so expected, as builder of detergent or as impurities in water for washing.

Still further, as shown in Table 3, a mixture comprising various Rh-Oxo-sulfates which differ from one another in the number of carbon atom contained is better in detergency than the corresponding mixed Co-Oxo-sulfates. On the other hand, it will be understood from the correlationships between the proportion of sulfates which differ from one another in the number of carbon atoms contained in the mixed Rh-Oxo-sulfates and detergencies thereof that the detergency of a mixture of sulfates, the number of carbon atoms contained therein being 13, 15, 17, 19 and 21, is found never inferior to those of mixed sulfates, the number of carbon atom contained therein being 13, 15 and 17 or 13, 15, 17 and 19, although it has been widely recognized in the prior art that such an exceedingly high alkyl sulfate as the one having 21 carbon atoms cannot be included in a combination of alkyl sulfates employed as detergent. The fact that such exceedingly high alkyl sulfates can be effectively employed as a component of detergents of significance from the view-point of efficient utilization of olefins as raw material.

While Oxo-alcohols are composed of various isomers, as has been mentioned, the components are considerably affected by the conditions under which Oxo-reaction takes place. Meanwhile, the individual chemical constituents as

TABLE 3

Properties of sodium salts of mixed alkyl sulfate derived from mixed alcohols

| | Number of carbon atoms in sulfates | | | | | | Solubility in water (° C.)— | | Foaming capacity (ml.) | | Detergency, percent | |
|---|---|---|---|---|---|---|---|---|---|---|---|---|
| | 11 | 13 | 15 | 17 | 19 | 21 | 0.3% | | | | Washing temperature of— g | |
| | | | | | | | Td | Ts | V | Ve | 40° C. | 17° C. |
| Sort | Proportion of sulfates in weight | | | | | | | | | | | |
| Rh-oxo-sulfates | 1 | 1 | 0.8 | 0.5 | 0.3 | 0.15 | 60 | 8 | 30 | 4.7 | 18.1 | 12.0 |
| | | 1 | 0.8 | 0.5 | | | 28 | 15 | 28 | 4.5 | 25.2 | 20.9 |
| | | 1 | 0.8 | 0.5 | 0.3 | | 39 | 14 | 27 | 4.5 | 29.0 | 25.2 |
| | | 1 | 0.8 | 0.5 | 0.3 | 0.15 | 36 | 15 | 29 | 4.5 | 29.1 | 30.0 |
| Co-oxo-sulfates | | 1 | 0.8 | 0.5 | 0.3 | 0.15 | | | | | 24.9 | 24.0 |
| Rh-oxo-sulfates | Number of carbon atom being 12 to 16; derived from oelfins obtained by wax cracking. | | | | | | | | | | 29.5 | 27.9 |
| Co-oxo-sulfates | Number of carbon atom being 12 to 16; derived from olefins obtained by wax racking. | | | | | | | | | | 31.0 | 15.4 | well as the proportion of the components of Oxo-alcohols derived by Rh-Oxo-reaction carried out by use of rhodium catalyst under the aforesaid reaction conditions, favourably affect the properties as surface active agent of the salts of sulfates obtained by the sulfation of said alcohols.

The Rh-Oxo-sulfate obtained in accordance with the invention is superior in biodegradability to the conventional alkylbenzenesulfonate of hard-type having multi-branch alkyl group and is comparable with alkylbenzenesulfonate of soft-type having few- or non-branch alkyl group, which has recently become available as a substitute for the said alkylbenzenesulfonate of hard-type. Namely, the Rh-Oxo-sulfate may well be used as biodegradable detergent.

The biodegradability of Rh-Oxo-sulfate (sodium salts) having 15 carbon atoms which is obtained by the process of Example 1 described hereinafter of the invention will now be compared with that of sodium alkylbenzenesulfonates of commercial hard-type or soft-type.

The biodegradability test was carried out as follows: 1 ml. of active mud collected from a septic tank was added to 99 ml. of an aqueous solution containing 0.001% sample surface active agent; the resulting mixed liquid was charged into a 200 ml. Erlenmeyer flask which was cultivated at 25° C. under introduction of air; a portion of the liquid under cultivation was collected every 24 hours to provide a sample with which the amount of remaining surface active agent was determined by the Longwell-Maniece's method (see Analyst, vol. 80, p. 167 (1955)). Table 4 shows the degradation rates which were calculated from the determined values.

TABLE 4
Biodegradability of surface active agents

| Surface active agent | Degradation rate, percent | | | |
|---|---|---|---|---|
| | (1) | (2) | (3) | (4) |
| Rh-oxo-sulfate ($C_{15}$) | 49.3 | 52.7 | 90.0 | 96.0 |
| Hard-type alkyl-benzenesulfonate | 14.0 | 15.3 | 16.0 | 18.7 |
| p-(n-Dodecyl)-benzene-sulfonate (soft type) | 46.7 | 62.7 | 86.6 | 98.0 |
| p-(1-methyl-undecyl)-benzenesulfonate (soft type) | 34.0 | 36.7 | 70.7 | 94.0 |

1 Degraded one day.
2 Degraded two days.
3 Degraded three days.
4 Degraded four days.

The process of the invention has a number of advantages as follows:

Olefins having carbon atoms over a wide range in number may be effectively utilized.

Alkyl sulfates to be obtained have an excellent detergency and adequate degradability.

Oxo-reaction during the process which permits rhodium catalyst to be employed in accordance with the invention is more advantageous than Oxo-reaction by use of cobalt catalyst in that the former allows as for example a greater yield of Oxo-alcohol and the production of Oxo-alcohol of an adequate purity irrespective of use of such mixture of olefins different from one another in the number of carbon atoms contained therein. Thus, the present invention provides a process for producing alkyl sulfates at a lower cost as compared with conventional processes in which natural high alcohols or Ziegler's Alfol (n-alcohols to be obtained by oxidation and hydrolysis of high alkyl aluminum) or Co-Oxo-alcohols are employed in lieu of Rh-Oxo-alcohols.

Some preferred embodiments of the invention are described in the following.

EXAMPLE 1

280 ml. of α-olefin referred to in Table 5 and a sufficient amount of aqueous rhodium nitrate solution having a concentration of 2 g./l. as metallic rhodium to give a concentration of 5 g./l. in the reaction vessel was charged into an autoclave of vertical agitation type. The interior of the autoclave was purged by use of carbon monoxide, which was further fed until the pressure thereof inside the autoclave reached 110 kg./cm.$^2$ G. at room temperatures. The reaction mixture was heated to 120° C. at which point hydrogen was fed under pressure so that the partial pressure of hydrogen became equivalent to that of carbon monoxide inside the autoclave at the temperature. The autoclave was then connected to a pressure accumulator in which the proportion of hydrogen to carbon monoxide was maintained at 1:1 in order to continue the reaction while maintaining the total pressure of the inside of the autoclave at 250 kg./cm.$^2$ G. After 90 minutes from the start of reaction, that is, the start of pressure feed of hydrogen, elapsed, the autoclave was cooled and the reaction was discontinued.

The reaction products cooled and discharged from the autoclave were charged, together with 50 g. of nickel catalyst carried on infusorial earth which had been hydrogenated beforehand and which contained 10% by weight of metallic nickel, into a 1 litre autoclave of shaking type in which hydrogen was fed under pressure until the pressure thereof reached 120 kg./cm.$^2$ G. at room temperatures. The reaction mixture was heated for 2 to 4 hours at 160° C. for hydrogenation. The resultant hydrogenation products were subjected to distillation under reduced pressure of about 1 to 5 mm. Hg in which the by-product paraffin was distilled off as first fraction and the alcohols were separated as main fraction.

The reaction conditions and results of the reaction are arranged in Table 5.

TABLE 5

| | | Rational formula of obtained alcohol | | | | | |
|---|---|---|---|---|---|---|---|
| | | $C_{11}H_{23}OH$ | $C_{13}H_{27}OH$ | $C_{15}H_{31}OH$ | $C_{17}H_{35}OH$ | $C_{19}H_{39}OH$ | $C_{21}H_{43}OH$ |
| Olefin used as raw material | | Decene-1 | Dodecene-1 | Tetra-decene-1 | Hexa-decene-1 | Octa-decene-1 | Eicosene-1 |
| Oxo-reaction condition | Amount of catalyst (mg./l.).[1] | 10 | 5 | 5 | 10 | 10 | 5 |
| | Reaction temperature (° C.) | 110 | 120 | 120 | 110 | 110 | 110 |
| | Reaction time (min.) | 70 | 70 | 90 | 75 | 50 | 75 |
| Oxo-reaction product | Carbonyl value [2] | 309.0 | 260.5 | 231.0 | 203.8 | 193.8 | 167.8 |
| | Acid value | 1.4 | 6.5 | 1.6 | 0.6 | 2.8 | 8.9 |
| | Saponification value | 40.0 | 28.1 | 41.8 | 41.1 | 30.5 | 46.1 |
| Hydrogenation product | Carbonyl value [2] | 0 | 1.7 | 1.3 | 1.2 | 0 | 2.4 |
| | Acid value | 1.4 | 1.7 | 0.5 | 1.2 | 3.4 | 3.8 |
| | Saponification value | 5.7 | 2.4 | 5.0 | 5.3 | 8.3 | 7.0 |
| | Hydroxy value | 305.6 | 257.7 | 225.3 | 207.3 | 180.0 | 156.3 |
| Distillation of alcohol, percent | First fraction | 1.7 | 5.3 | 5.9 | 4.7 | 3.6 | 3.7 |
| | Main fraction | 94.3 | 89.8 | 90.5 | 91.2 | 90.8 | 89.2 |
| | Still residue | 1.9 | 3.6 | 2.9 | 2.9 | 5.6 | 5.8 |

[1] Amount in milligrams of catalyst corresponding to metallic rhodium per 1 litre α—olefin.

[2] Amount in milligrams of potassium hydroxide required for neutralization of hydrochloric acid isolated by the reaction of 1 g. sample with hydroxylamine hydrochloride.

1 mol of the Oxo-alcohol thus obtained (and chloroform in an amount 0.5–2 times against alcohol in the case of alcohol having carbon atom more than 15) was put in a flask provided with a stirrer, thermometer, reflux condenser and tap funnel into which was added gradually 1.02 mol of chlorosulfonic acid under stirring while maintaining the reaction temperature at about 30° C. Upon completion of the addition, the tap funnel was replaced by a gas-inlet pipe. The reaction mixture was maintained at 35° C. for 1 hour, and nitrogen gas was then introduced into the mixture so as to remove unreacted chlorosulfonic acid and by-produced hydrogen chloride.

The reaction products were diluted by an aqueous 90% isopropanol at a temperature below 35° C. and neutralized by about 2 mol sodium hydroxide. After neutralization the reaction products were heated to 80° C. and filtered to remove insoluble inorganic salt. The filtrate was concentrated by distilling off the solvent. The concentrated product was diluted by methanol and again filtered to remove insoluble inorganic salt. Methanol was distilled off the filtrate to obtain sodium salt of the alkyl sulfate.

TABLE 6

| Number of carbon atom contained in alcohol used as raw material | Salt of alkyl sulfate obtained | |
|---|---|---|
| | Rational formula | Yield, percent |
| 11 | $C_{11}H_{23}OSO_3Na$ | 90 |
| 13 | $C_{13}H_{27}OSO_3Na$ | 83 |
| 15 | $C_{15}H_{31}OSO_3Na$ | 91 |
| 17 | $C_{17}H_{35}OSO_3Na$ | 97 |
| 19 | $C_{19}H_{39}OSO_3Na$ | 99 |
| 21 | $C_{21}H_{43}OSO_3Na$ | 99 |

Further, in order to prepare samples for use in comparative experiments with regard to detergency, etc., sodium salt of the Co-Oxo-sulfate was obtained by carrying out Oxo-reaction, hydrogenation, sulfation and neutralization by the same processed as in this example. However, the use of dicobalt octacarbonyl as Oxo-reaction catalyst in the amount of 1.5 g. as metallic cobalt per 1 liter of tetradecene-1 was substituted for rhodium nitrate. The removal of cobalt catalyst was effected upon completion of Oxo-reaction and prior to hydrogenation. The removal of the cobalt catalyst was accomplished by adding an aqueous 10% maleic acid solution to the Oxo-reaction products in an amount of 1/10 volume of the latter. The resultant mixture was heated and stirred at 80° C. for 1 hour, and left standing for cooling to remove the separated aqueous layer into which the salt of cobalt was allowed to migrate.

EXAMPLE 2

The Rh-Oxo-alcohols obtained in Example 1 which were different from one another in the number of carbon atoms contained therein were admixed at the proportions as shown in Table 8, then sulfated as in Example 1 without use of chloroform, and neutralized to obtain four kinds of a mixture of sodium salt alkyl sulfates. The yield from each of the mixed alcohols is shown in Table 8.

TABLE 8

| Carbon atom in number contained in alcohol | | | | | | Yield of sulfate salt in percent |
|---|---|---|---|---|---|---|
| 11 | 13 | 15 | 17 | 19 | 21 | |
| Proportion of alcohols in weight | | | | | | |
| 1 | 1 | 0.8 | 0.5 | 0.3 | 0.15 | 89 |
| | 1 | 0.8 | 0.5 | | | 85 |
| | 1 | 0.8 | 0.5 | 0.3 | | 95 |
| | 1 | 0.8 | 0.5 | 0.3 | 0.75 | 94 |

Similarly, a mixture of sodium salt alkyl sulfates was prepared from Co-Oxo-alcohols mixed in the proportions as indicated at the bottom of Table 8.

EXAMPLE 3

The Oxo-reaction of an olefin mixture composed substantially of α-olefins having 11–15 carbon atoms which were obtained by wax-cracking was carried out by use of the same rhodium catalyst under the same reaction conditions as in Example 1. The reaction mixture was then hydrogenated by use of 50 g. of copper-chromite (so-called Adkin's catalyst) substituted for nickel catalyst used in Example 1 as hydrogenation catalyst under the same reaction conditions as in Example 1. The alcohol mixture resulted from the distillation of the reaction product was sulfated and neutralized as in Example 1 to yield a sulfate mixture composed of sodium salts of alkyl sulfate having 12–16 carbon atoms.

The reaction conditions and results of the reaction are tabulated in Table 9.

In order to prepare samples for use in comparative experiments, a sulfate mixture composed of sodium salts of Co-Oxo-sulfate having 12–16 carbon atoms was obtained by oxo-reaction, hydrogenation, sulfation and neutralization effect in the same way as in Example 1 excepting the use of dicobalt octacarbonyl in lieu of rhodium nitrate used in Example 1 as Oxo-reaction catalyst and the removal of cobalt catalyst after Oxo-reaction. The reaction conditions and results of the reaction are shown in Table 9.

TABLE 7

| | | Rational formula of obtained co-oxo-sulfate | | | | |
|---|---|---|---|---|---|---|
| | | $C_{13}H_{27}OSO_3Na$ | $C_{15}H_{31}OSO_3Na$ | $C_{17}H_{35}OSO_3Na$ | $C_{19}H_{39}OSO_3Na$ | $C_{21}H_{43}OSO_3Na$ |
| Olefin used as raw material | | Dodecene-1 | Tetradecene-1 | Hexadecene-1 | Octadecene-1 | Eicosene-1 |
| Oxo-reaction condition | Reaction temperature (° C.) | 120 | 120 | 120 | 120 | 120 |
| | Reaction time (min.) | 70 | 70 | 70 | 70 | 70 |
| Oxo-reaction product | Carbonyl value | 239.5 | 208.0 | 185.1 | 163.2 | 148.4 |
| | Acid value | 0.9 | 1.9 | 0.8 | 2.8 | 4.7 |
| | Saponification value | 34.9 | 26.1 | 25.3 | 32.7 | 40.6 |
| Hydrogenation product | Carbonyl value | 0 | 0 | 0.9 | 1.7 | 2.2 |
| | Acid value | 0.9 | 0.6 | 0.6 | 3.0 | 3.1 |
| | Saponification value | 2.4 | 3.8 | 5.3 | 5.9 | 7.0 |
| | Hydroxy value | 239.1 | 209.5 | 194.3 | 160.1 | 147.5 |
| Distillation of alcohol, percent | First fraction | 8.0 | 9.0 | 10.2 | 9.4 | 10.4 |
| | Main fraction | 84.1 | 84.1 | 83.0 | 81.2 | 80.7 |
| | Still residue | 6.2 | 5.4 | 5.4 | 9.0 | 8.0 |
| Yield of salt of sulfate from alcohol, percent | | 85 | 93 | 97 | 99 | 98 |

TABLE 9

| Sort of catalyst | | Rh(NO₃)₃ | Co₂(CO)₈ |
|---|---|---|---|
| Oxo-reaction condition | Amount of catalyst (mg./l)* | 20 | 1500 |
| | Reaction temperature (° C.) | 120 | 120 |
| | Reaction time (min.) | 180 | 40 |
| Oxo-reaction product | Carbonyl value | 253.6 | 229.5 |
| | Acid value | 0.6 | 1.2 |
| | Saponification value | 43.5 | 58.6 |
| Hydrogenation product | Carbonyl value | 0.3 | 0 |
| | Acid value | 0.3 | 0.6 |
| | Saponification value | 1.1 | 2.2 |
| | Yydroxy value | 262.6 | 223.3 |
| Distillation of alcohol, percent | First fraction | 9.7 | 15.1 |
| | Main fraction | 80.0 | 74.2 |
| | Still residue | 8.5 | 8.3 |
| Yield of salt of sulfate from alcohol, percent | | 97 | 98 |

*Amount in milligrams corresponding to metallic rhodium or cobalt per 1 litre olefins.

EXAMPLE 4

The oxo-reaction of tetradecene-1 was carried out by the same process as in Example 1 in the presence of the four kinds of rhodium catalyst as referred to in Table 10 and the resultant reaction mixture was subjected to hydrogenation, sulfation and neuralization effected by the same processes under the same conditions as in Example 1 to produce sodium salt of n-pentadecyl sulfate $$C_{15}H_{31}OSO_3Na$$

Amongst rhodium catalysts, rhodium chloride was used as an aqueous solution thereof having the concentration identical to that of rhodium nitrate in Example 1 while other catalysts, i.e., tetracarbonyl-μ,μ'-dichlorodirhodium (I), rhodium tricarbonyl and carbonyl-bis (triphenyl-phosphine)-chlororhodium (I) were used as being dissolved in the olefin used as raw material.

Table 10 shows the reaction conditions and results of the reaction and the detergency of sulfates obtained, the method of determining detergency being the same to the foregoing.

TABLE 10

| Sort of catalyst | | RhCl₃ | [Rh(CO)₂Cl]₂ | [Rh(CO)₃]ₙ | [Rh(CO)(Rh₃P)₂Cl] |
|---|---|---|---|---|---|
| Oxo-reaction condition | Amount of catalyst (mg/l)* | 10 | 10 | 5 | 5 |
| | Reaction temperature (° C.) | 100 | 120 | 120 | 120 |
| | Reaction time (min.) | 120 | 30 | 90 | 90 |
| Oxo-reaction product | Carbonyl value | 229.0 | 238.5 | 233.7 | 232.6 |
| | Acid value | 1.0 | 1.2 | 1.1 | 0.9 |
| | Saponification value | 38.2 | 40.5 | 42.4 | 41.7 |
| Hydrogenation product | Carbonyl value | 0.4 | 1.1 | 0.8 | 0.7 |
| | Acid value | 0.7 | 0.5 | 0.9 | 1.2 |
| | Saponification value | 1.6 | 1.2 | 1.1 | 1.8 |
| | Hydroxy value | 228.8 | 240.1 | 232.6 | 230.1 |
| Distillation of alcohol, percent | First fraction | 6.1 | 3.9 | 4.0 | 4.2 |
| | Main fraction | 89.9 | 92.1 | 90.5 | 91.0 |
| | Still residue | 4.0 | 3.8 | 5.1 | 4.9 |
| Yield of salt of sulfate from alcohol, percent | | 92 | 95 | 93 | 92 |
| Detergency of salt of sulfate, percent | Washing at 40° C | 28.8 | 26.5 | 27.0 | 28.0 |
| | Washing at 17° C | 27.0 | 24.6 | 26.0 | 25.5 |
| | Washington at 10° C | 16.0 | 17.0 | 14.5 | 15.0 |

* Amount in milligrams corresponding to metallic rhodium per 1 litre olefins.

What we claim is:

1. A surface active agent composition comprising salts of high molecular weight alkyl sulfates obtained by the method comprising (a) reacting a straight chain alpha-olefin having 10 to 24 carbon atoms or a mixture consisting essentially thereof with carbon monoxide and hydrogen in the presence of a rhodium catalyst, (b) hydrogenating the resultant reaction product to form high molecular weight alcohols, (c) sulfating said alcohols by means of a sulfating agent, and (d) neutralizing the resultant sulfation products by means of a basic material selected from the group consisting of alkali metal hydroxides, alkaline earth metal hydroxides, alkanol amines and ammonia to form salts of said alkyl sulfates.

(References on following page)

References Cited

UNITED STATES PATENTS

| | | | |
|---|---|---|---|
| 2,618,649 | 11/1952 | Van Bavet et al. | 260—459 |
| 2,880,241 | 3/1959 | Hughes | 260—604 |
| 3,081,357 | 3/1963 | Alderson et al. | 260—635 |
| 3,092,670 | 6/1963 | Gwynn et al. | 260—638 |
| 3,338,949 | 8/1967 | Hagemeyer et al. | 260—460 X |
| 3,234,258 | 2/1966 | Morris | 260—460 |

FOREIGN PATENTS

| | | | |
|---|---|---|---|
| 708,441 | 5/1954 | Great Britain | 260—604 OXO |

OTHER REFERENCES

Livingston et al., "Detergency and Biodegradability of Alcohol-Based sec-Sulfates," I.O.E.C. Product Research and Development. vol. 4, No. 1, pp. 28–32 (March 1965).

LEON ZITVER, Primary Examiner

L. DE CRESCENTE, Primary Examiner

U.S. Cl. X.R.

252—161; 260—604 HF, 638 HF